(12) United States Patent
Jung et al.

(10) Patent No.: US 10,511,966 B2
(45) Date of Patent: Dec. 17, 2019

(54) MOBILE DEVICE, METHOD FOR DISPLAYING SCREEN THEREOF, WEARABLE DEVICE, METHOD FOR DRIVING THE SAME, AND COMPUTER-READABLE RECORDING MEDIUM

(71) Applicant: Samsung Electronics Co., Ltd., Suwon-si, Gyeonggi-do (KR)

(72) Inventors: Jong-woo Jung, Suwon-si (KR); In-sik Myung, Incheon (KR); Sahng-hee Bahn, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 14/818,490

(22) Filed: Aug. 5, 2015

(65) Prior Publication Data
US 2016/0044502 A1 Feb. 11, 2016

(30) Foreign Application Priority Data
Aug. 5, 2014 (KR) .......................... 10-2014-0100670

(51) Int. Cl.
*H04W 12/02* (2009.01)
*H04W 4/80* (2018.01)
(Continued)

(52) U.S. Cl.
CPC .......... *H04W 12/02* (2013.01); *H04L 63/0853* (2013.01); *H04L 63/107* (2013.01);
(Continued)

(58) Field of Classification Search
CPC ....... H04W 12/02; H04W 4/00; H04W 4/008; H04W 12/06; H04W 88/02;
(Continued)

(56) References Cited

U.S. PATENT DOCUMENTS 8,811,951 B1 * 8/2014 Faaborg .................. H04M 1/57
340/384.1
8,884,874 B1 * 11/2014 Kim ........................ G06F 3/017
345/156
(Continued)

FOREIGN PATENT DOCUMENTS

CN 102158826 A 8/2011
CN 102547606 A 7/2012
(Continued)

OTHER PUBLICATIONS

Anonymous: 11 Design for Notifications : Android Developers sections on the lockscreen, The user decides what shows on the secure lockscreen; Jun. 26, 2014; URL: http://spot.pcc.edu/-mgoodman/developer.android.com/preview/notifications.html; XP055425035.

(Continued)

*Primary Examiner* — Brandon J Miller
(74) *Attorney, Agent, or Firm* — Jefferson IP Law, LLP

(57) ABSTRACT

A mobile device, a method for displaying a screen thereof, a wearable device, a method for driving the same, and a computer-readable recording medium are provided. The mobile device operating with a wearable device includes a display configured to display a private screen which is personalized to a user after authentication of the wearable device based on at least one of a user state and an operational state of the mobile device and a controller configured to control the display to display the private screen after the authentication.

22 Claims, 16 Drawing Sheets

(51) Int. Cl.
*H04M 1/725* (2006.01)
*H04W 12/06* (2009.01)
*H04L 29/06* (2006.01)
*H04M 19/04* (2006.01)
*H04W 12/00* (2009.01)
*H04W 88/02* (2009.01)

(52) U.S. Cl.
CPC ......... *H04M 1/7253* (2013.01); *H04M 19/04* (2013.01); *H04W 4/80* (2018.02); *H04W 12/003* (2019.01); *H04W 12/06* (2013.01); *H04W 12/00503* (2019.01); *H04W 88/02* (2013.01)

(58) Field of Classification Search
CPC ................. H04W 12/003; H04W 4/80; H04W 12/00503; H04L 63/107; H04L 63/0853; H04M 1/7253; H04M 19/04
See application file for complete search history.

(56) References Cited

U.S. PATENT DOCUMENTS

| | | | |
|---|---|---|---|
| 9,148,750 B2* | 9/2015 | Murakami | H04W 4/008 |
| 2002/0068600 A1* | 6/2002 | Chihara | H04B 1/385 |
| | | | 455/557 |
| 2003/0048174 A1* | 3/2003 | Stevens | G06F 21/35 |
| | | | 340/5.64 |
| 2003/0151982 A1* | 8/2003 | Brewer | G04G 21/00 |
| | | | 368/46 |
| 2003/0204526 A1 | 10/2003 | Salehi-Had | |
| 2004/0113819 A1* | 6/2004 | Gauthey | G06F 21/36 |
| | | | 341/34 |
| 2008/0216171 A1 | 9/2008 | Sano et al. | |
| 2011/0214158 A1 | 9/2011 | Pasquero et al. | |
| 2011/0265149 A1 | 10/2011 | Ganesan | |
| 2013/0324081 A1 | 12/2013 | Gargi et al. | |
| 2014/0101755 A1* | 4/2014 | Tang | H04W 4/80 |
| | | | 726/20 |
| 2014/0143737 A1 | 5/2014 | Mistry et al. | |
| 2014/0155031 A1 | 6/2014 | Lee et al. | |
| 2014/0171055 A1* | 6/2014 | Oshita | H04W 4/12 |
| | | | 455/418 |
| 2014/0337621 A1* | 11/2014 | Nakhimov | G06F 1/163 |
| | | | 713/168 |
| 2014/0337748 A1* | 11/2014 | Lee | H04L 67/025 |
| | | | 715/740 |
| 2014/0366123 A1* | 12/2014 | DiBona | G06F 21/60 |
| | | | 726/16 |
| 2015/0020081 A1* | 1/2015 | Cho | G06F 9/542 |
| | | | 719/318 |
| 2015/0186636 A1* | 7/2015 | Tharappel | G06F 21/32 |
| | | | 726/8 |
| 2016/0037346 A1* | 2/2016 | Boettcher | H04M 1/72519 |
| | | | 455/411 |
| 2016/0086176 A1* | 3/2016 | Silva Pinto | G06Q 20/401 |
| | | | 705/44 |
| 2016/0249211 A1* | 8/2016 | Strand | H04W 76/14 |
| 2016/0277891 A1* | 9/2016 | Dvortsov | H04W 4/023 |
| 2017/0026791 A1* | 1/2017 | Weizman | H04W 64/00 |

FOREIGN PATENT DOCUMENTS

| | | |
|---|---|---|
| CN | 103957227 A | 7/2014 |
| KR | 10-2014-0058140 A | 5/2014 |
| WO | 2008/085844 A1 | 7/2008 |
| WO | 2013/166651 A1 | 11/2013 |

OTHER PUBLICATIONS

Cameron Summerson: 11 Android 11 L11 Feature Spotlight: Lockscreen Notifications, Actions, and Media Controls11 "paragraph starting with 11 Another new feature on the lockscreen is enhanced notifications. 11 and following screenshots"; Jun. 26, 2014; URL: http: //www.androidpolice.com/2014/06/26/android-1-feature-spotlight-lockscreen-notifications-actions-and-media-controls/; XP055425188.
Chinese Office Action dated Aug. 30, 2019, issued in Chinese Application No. 201580042018.0.

* cited by examiner

FIG. 3
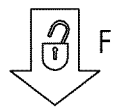
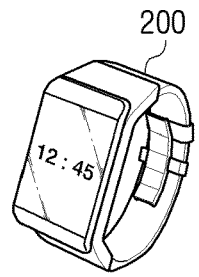
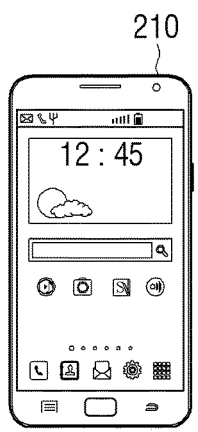

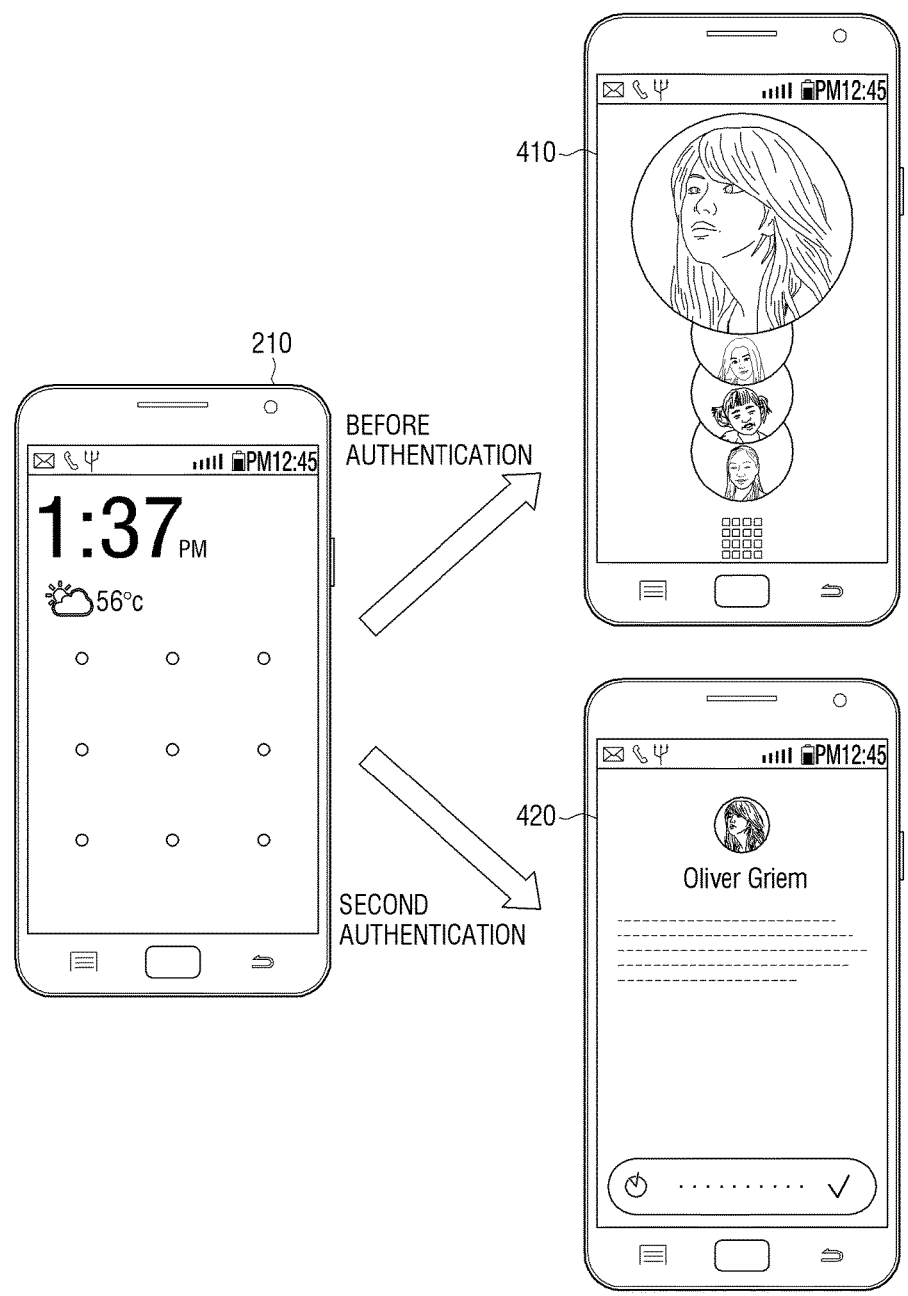

S-Health

Watch On

Message
Missed Call
SNS Updates

MOBILE DEVICE, METHOD FOR DISPLAYING SCREEN THEREOF, WEARABLE DEVICE, METHOD FOR DRIVING THE SAME, AND COMPUTER-READABLE RECORDING MEDIUM

CROSS-REFERENCE TO RELATED APPLICATION(S)

This application claims the benefit under 35 U.S.C. § 119(a) of a Korean patent application filed on Aug. 5, 2014 in the Korean Intellectual Property Office and assigned Serial number 10-2014-0100670, the entire disclosure of which is hereby incorporated by reference.

TECHNICAL FIELD

The present disclosure relates to a mobile device, a method for displaying a screen thereof, a wearable device, a method for driving the same, and a computer-readable recording medium. More particularly, the present disclosure relates to a mobile device where only a user wearing a wearable device, for example, Galaxy Gear™, is able to control a particular operation, such as, an unlock operation of the mobile device which requires enhanced security and usability to display a personalized screen, a method for displaying a screen thereof, a wearable device, a method for driving the same, and a computer-readable recording medium.

BACKGROUND

Generally, a user authentication method is classified into a knowledge-based method, an ownership-based method, and a characteristic-based method. The knowledge-based method includes an identification (ID)/password as a representative example. The ownership-based method refers to directly presenting ID information of a medium that a user owns, such as a one-time password device (OTP) or an accredited certificate. The characteristic-based method refers to a method of performing authentication based on user characteristics. The characteristic-based method includes fingerprint recognition, iris recognition, voice recognition, etc., for example.

Such user authentication methods have been applied to diverse devices and have come into wide use. For example, in case of a mobile device such as a mobile phone, a user is able to set a password such as inputting certain numbers or drawing a certain pattern. In this case, the mobile device determines whether the user is entitled to use the mobile device based on the input password.

However, in the user authentication method, a security vulnerability issue has been identified. For example, in case of pattern recognition, a password may be tracked based on a user trace which remains in a screen.

In addition, a user is inconvenienced by releasing a lock state of a mobile device several times, even though the user is entitled to use the mobile device.

Furthermore, the method also has another security vulnerability issue that exposes detailed information in a very private area such as a short message service (SMS).

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mobile device where only a user wearing a wearable device, for example, Galaxy Gear™, is able to control a particular operation, such as, an unlock operation of the mobile device which requires enhanced security and usability to display a personalized screen.

In accordance with an aspect of the present disclosure, a mobile device operating with a wearable device is provided. The mobile device includes a display configured to display a private screen which is personalized to a user after authentication of the wearable device based on at least one of a user state and an operational state of the mobile device and a controller configured to control the display to display the private screen after the authentication.

When information received by the mobile device is present and the user is able to check the received information as the operational state, the controller is configured to control the display to display the received information as the private screen.

The controller may control the display to display a predetermined public screen to notify that the information is received before the authentication of the wearable device.

When the information received by the mobile is present and the user is absent as the operational state, the controller is configured to control the display to display the received information while the user is absent as the private screen.

When the information is generated in the mobile device as the operational state, the controller is configured to control the display to display the generated information as the private screen.

When the information received by the mobile device is not present and details related to an application pre-stored by the user being present as the operational state, the controller is configured to control the display to display the pre-stored application as the private screen.

The mobile device may further include a communication device configured to perform local area communication to connect the mobile device to the wearable device and an auxiliary signal detector configured to detect an auxiliary signal. In response to the auxiliary signal being detected, the controller performs the authentication.

The communication signal may have a transmission distance shorter than a transmission distance of the auxiliary signal. In addition, the auxiliary signal may be a magnetic field.

The mobile device may further include a graphical user interface (GUI) generating unit configured to generate the public screen before the authentication and generate the private screen after the authentication.

In accordance with another aspect of the present disclosure, a method for displaying a screen of a mobile device operating with a wearable device is provided. The method includes displaying a public screen which is exposable to outside before authentication of the wearable device based on at least one of a user state and an operational state of the mobile device and displaying a private screen which is personalized to the user after the authentication of the wearable device.

When information received by the mobile device is present and the user is able to check the received information as the operational state, the displaying of the private screen comprises displaying the received information as the private screen.

The displaying of the public screen may include notifying that the information is received through the public screen before the authentication of the wearable device.

When the information received by the mobile is present and the user is absent as the operational state, the displaying of the private screen comprises displaying the received information while the user is absent as the private screen.

When the information is generated in the mobile device as the operational state, the displaying of the private screen comprises displaying the generated information as the private screen.

When the information received by the mobile device is not present and details related to an application pre-stored by the user is present as the operational state, the displaying of the private screen comprises displaying the pre-stored application as the private screen.

In accordance with another aspect of the present disclosure, a computer-readable recording medium comprising a program for executing a method for displaying a screen of a mobile device operating with a wearable device is provided. The method includes displaying a public screen which is exposable to outside before authentication of the wearable device based on at least one of a user state and an operational state of the mobile device and displaying a private screen which is personalized to the user after the authentication of the wearable device.

In accordance with another aspect of the present disclosure, a wearable device is provided. The wearable device includes a communication device configured to perform local area communication to connect the wearable device with an adjacent mobile device and an auxiliary signal generating unit configured to generate an auxiliary signal to be used to control the mobile device based on local area communication.

The auxiliary signal may have a transmission distance shorter than a transmission distance of a communication signal of the local area communication. In addition, the auxiliary signal generating unit generates a magnetic field as the auxiliary signal.

The wearable device may further include a storage configured to store first authentication information for authentication, a user interface configured to receive second authentication information from a user, and a controller configured to compare the first authentication information and the second authentication information to determine an entitled user of the wearable device. In response to determining that the user is the entitled user, the controller may perform the local area communication to control the mobile device.

The wearable device may further include a release detector configured to detect detachment of the wearable device. The communication device may transmit release information on the release to the mobile device so as to stop a control operation of the mobile device.

The wearable device may further include a user interface configured to perform first authentication with respect to a user who uses the wearable device. The communication signal and the auxiliary signal are used for second authentication.

In accordance with another aspect of the present disclosure, a method for driving a wearable device is provided. The method includes performing local area communication to connect the wearable device to an adjacent mobile device and generating an auxiliary signal to control the mobile device along with a communication signal of the local area communication.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a view illustrating an authentication system according to a third embodiment of the present disclosure;

FIG. 4 is a view illustrating a predetermined operation of a mobile device according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
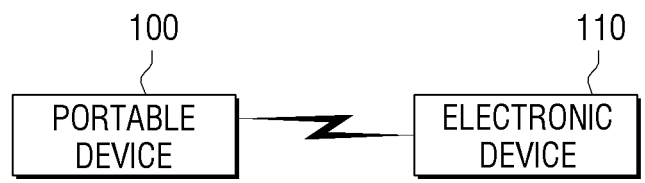
FIG. 1 is a view illustrating an authentication system according to a first embodiment of the present disclosure.

FIG. 1 is a view illustrating an authentication system according to a first embodiment of the present disclosure.

Referring to FIG. 1, an authentication system according to the first embodiment of the present disclosure may include a portable device 100 and an electronic device 110.

The portable device 100 refers to a supplementary device for controlling the electronic device 110 and is configured as a mobile device that a user is able to carry. For example, the portable device 100 may include a mobile phone, such as, a smart phone, a Moving Picture Experts Group phase 1 or phase 2 (MPEG-1 or MPEG-2) audio layer 3 (MP3) player, a plasma display panel (PDP), a personal digital assistant (PDA), and the like. Alternatively, the portable device 100 may include an electronic card such as a transportation card or a credit card. The portable device 100 includes a communication module to perform communication according to certain general communication methods, such as, code division multiple access (CDMA), wideband CDMA (WCDMA), etc., to perform local area communication according to certain communication methods, such as, Bluetooth (BT), Wireless-Fidelity (Wi-Fi), etc., and to perform a search for the electronic device 110 in the vicinity. In some embodiments, the portable device 100 may be connected to the adjacent electronic device 110. In response to the electronic device 110 entering an area where the local area communication is available, the portable device 100 may connect to the electronic device 110.

The portable device 100 may use a communication signal according to the local area communication as a main signal and may generate an auxiliary signal having a transmission distance shorter than a transmission distance of the communication signal. Accordingly, the portable device 100 includes an auxiliary signal generating unit for generating the auxiliary signal. Meanwhile, the auxiliary signal may be a magnetic field. A description of the auxiliary signal will be provided below. Besides the magnetic field, various signals may be used. For example, in response to the portable device 100 entering a predetermined communication radius by the local area communication, the portable device 100 may emit infrared light in a predetermined form. In this case, the predetermined form refers to a protocol including the number of flicker as well as simple emission.

Meanwhile, the electronic device 110 may perform a predetermined operation by using the communication signal, that is, a main signal, and the auxiliary signal provided by the portable device 100. The electronic device 110 may be a door device installed on a vehicle or a door at a house or may be any suitable type of device such as an image display device, etc. The image display device may include a laptop personal computer (PC), a television (TV), a desktop PC, a tablet PC, etc. For example, in response to the portable device 100 entering a radius of the local area communication, the electronic device 110 may perform the local area communication and perform first authentication to determine whether a user is an entitled user and, in response to detecting the auxiliary signal, may additionally perform a second authentication to determine whether the user is the entitled user. For example, the electronic device 110 may store and use a user identification (ID) for first authentication. For second authentication, the electronic device 110 may perform the authentication in response to a predetermined signal being detected, without storing any information. For example, the electronic device 110 may detect a magnetic field or particular infrared light emitted from the portable device 100 for the second authentication. When the electronic device 110 needs to determine whether the infrared light is detected as a particular pattern, the electronic device 110 may pre-store pattern information.

Assuming that the electronic device 110 is a vehicle, a door of the vehicle may be unlocked in response to the first authentication, that is, a BT signal, and an ignition of the vehicle may be turned on in response to the second authentication, that is, the detecting of the auxiliary signal. That is, the ignition of a vehicle is related to crucial safety issue, and thus, the ignition should be turned on when a user is sufficiently close to a steering wheel. In addition, assuming that the electronic device 110 is a TV, the TV may be set so as to be inaccessible to broadcast content for adults before the second authentication is performed. In this case, a lock state of the TV may be released automatically or an access limit to the broadcast content for adults, for example, a particular channel, may be released only when the portable device 100 that an adult owns accesses the TV. Such function may increase user convenience significantly.

Hereinafter, an authentication system will be described in details with reference to the wearable device and the mobile device in FIG. 2.

Figure 2:
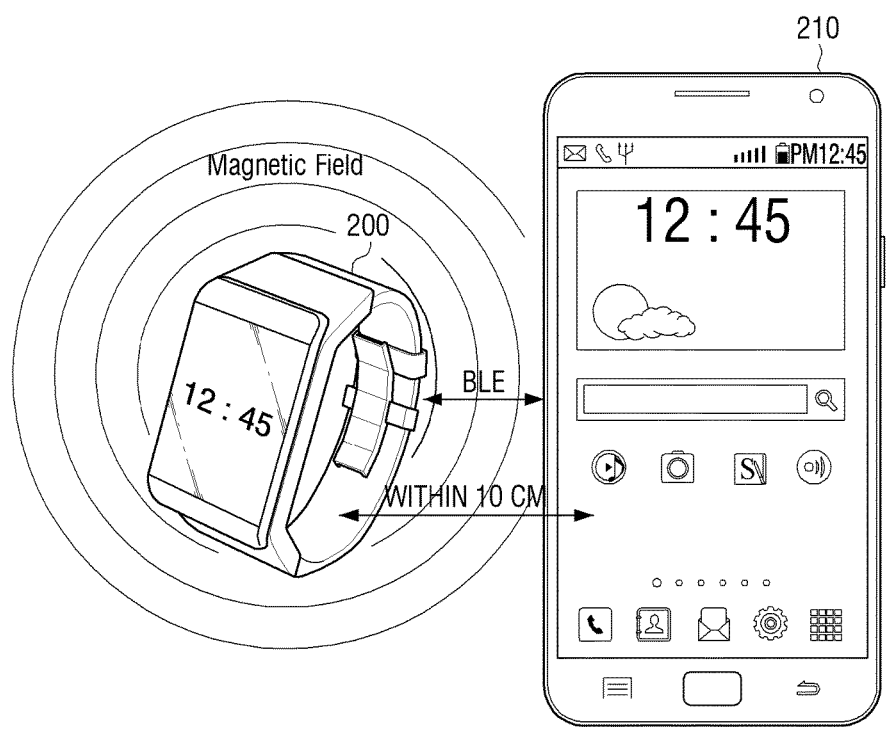
FIG. 2 is a view illustrating an authentication system according to a second embodiment of the present disclosure.

FIG. 2 is a view illustrating an authentication system according to a second embodiment of the present disclosure.

Referring to FIG. 2, an authentication system according to the second embodiment of the present disclosure includes a wearable device 200 and a mobile device 210.

In this case, unlike the portable device 100 in FIG. 1, the wearable device 200 requires a user to wear the wearable device 200, that is, there must be contact between the user and the wearable device 200, and thus, the wearable device 200 may have improved security. The wearable device 200 may include a necklace, an electronic watch, etc., as well as a wristwatch-type PC, for example, a Galaxy Gear™ as illustrated in FIG. 2. Such devices may use a magnetic field to further strengthen the security. A magnetic force (or magnetism) of a magnetic field may be controlled by changing a magnetic substance, and thus, may be simpler to implement than the infrared light.

For example, in response to the wearable device 200 entering the communication radius for performing the local area communication with the mobile device 210, the wearable device 200 may perform a connection operation using, for example, Bluetooth Low Energy (BLE). The wearable device 200 includes a magnetic field generating unit (not shown) configured to generate a magnetic field as the auxiliary signal, and the magnetic field may be configured to be recognized within approximately 10 centimeters (cm). The magnetic field generating unit may be mounted on a strap of the wearable device 200.

The wearable device 200 may determine whether the user wears the wearable device 200, and in response to determining that that the user removes of the wearable device 200, the wearable device 200 may transmit release information to the mobile device 210. For example, in case of the wearable device 200 having the magnetic field generating unit mounted on a side of the strap and a magnetic field detector mounted on the other side of the strap, in response to the magnetic field not being detected by the magnetic field detector after the user wears the wearable device 200, the wearable device 200 may determine that the wearable device 200 has been removed. Alternatively, if the wearable device includes a light emitter mounted on a side of the strap and a light receiver mounted on the other side of the strap, in response to any light not being received by the light receiver after the user wears the wearable device 200, the wearable device 200 may determine that the wearable device 200 has been removed. In this case, the light emitter may be a light emitting diode (LED).

The mobile device 210 controls a predetermined operation by using a local area communication signal and an auxiliary signal received from the wearable device 200. That is, in response to the wearable device 200 entering the communication radius where the local area communication is available, the mobile device 210 determines whether the auxiliary signal is detected from the wearable device 200. In response to detecting the auxiliary signal, the mobile device 210 may determine that the wearable device 200 is proximate to the mobile device 210, and thus, may automatically release a lock screen or may control various predetermined operations.

For example, in addition to an auto-release operation with respect to a lock screen, the mobile device 210 may control to display information on a private area in a screen. That is, when the authentication by the auxiliary signal is not performed, the mobile device 210 may briefly display a state (e.g., a state where there is an incoming call or a state where a text message is arrived, etc.) in a public area which may be publically observable. If a user wears the mobile device 210, the wearable device 200 may display a screen that is not easily observed by others (i.e., the screen is deemed to be private). In addition, the mobile device 210 may perform an operation for controlling a graphical user interface (GUI) screen by using an auxiliary signal according to various methods. The operation will be described below in further details.

In the above-described operation, in response to determining that the magnetic field is not detected from the wearable device 200 or in response to receiving the release information notifying that the user has removed the wearable device 200, the mobile device 210 may stop a control operation with respect to a predetermined operation of the mobile device 210.

FIG. 3 is a view illustrating an authentication system according to a third embodiment of the present disclosure.

Referring to FIG. 3, an authentication system according to the third embodiment is different from the authentication system in FIG. 2 in that the wearable device 200 requests additional user authentication.

In response to a user initially wearing the wearable device 200, the wearable device 200 requests an input of a particular pattern, a password, or a fingerprint for the user authentication to add additional measures as compared with the authentication system in FIG. 2. Once the user authentication is completed, the wearable device 200 does not request additional input of the pattern, password, or fingerprint again until the wearable device 200 is detached from the user. In response to the wearable device 200 being detached from the user, the wearable device 200 may reset the pattern, password, or fingerprint information. That is, after removing the wearable device 200, the wearable device 200 may request the pattern, password, or fingerprint when the wearable device 200 is worn again.

More particularly, in response to the first authentication being performed through an interface with a user (or before the authentication by a magnetic field is performed according to the local area communication), the wearable device 200 may display a user interface for the first authentication. Upon completion of the first authentication, the wearable device 200 determines whether an auxiliary signal, such as, a magnetic field, is detected and controls a predetermined operation of the mobile device 210.

FIG. 4 is a view illustrating a predetermined operation of a mobile device according to an embodiment of the present disclosure.

Referring to FIG. 4, the predetermined operation of the mobile device 210 may include various operations. For example, as described above, the predetermined operation may include releasing a lock screen of the mobile device 210 or displaying a different GUI screen before the authentication by an auxiliary signal and a GUI screen after the authentication by an auxiliary signal as illustrated in FIG. 4. Herein, a screen 410 is displayed before the authentication and belongs to a screen of the public area. The screen 410 may be referred to as a showcase screen that illustrates a showcase that anyone can see. Meanwhile, a screen 420 is a screen after the authentication by an auxiliary signal and belongs to a screen of the private area. The screen 420 may be referred to as a welcome screen.

For example, the mobile device 210 may divide a lock screen into a showcase screen and a welcome screen and vary a level of information according to the authentication. That is, the lock screen may be realized as a screen structure consisting of a showcase screen, a welcome screen, and a home screen, not the existing screen structure consisting of a lock screen and a home screen. In the showcase screen which belongs to the public area, a content registered by a user, such as, a picture, a moving image, and music, may be played back before the authentication. In response to an incoming call or text message, the showcase screen displays only a notification and does not display details on the incoming call or text message. By contrast, the welcome screen may display details on an incoming event or important information for the user after the authentication process. In addition, after the authentication process by the auxiliary signal, the mobile device 210 may enter the welcome screen automatically and additionally display personal information.

The showcase (or lock screen) is a customizable screen that is prepared according to the user's preferences. That is, in the showcase screen, an owner of the mobile device 210 is able to actively express their preferences. A photo showcase may generate a slide show using preferred pictures of a gallery. The showcase screen may control the existing pattern-input user interface (UI) and use a full screen so that an unconstrained interaction is performed. Alternatively, the showcase screen may only display a notification regarding an incoming call (or telephone conversation) or an incoming text message. By contrast, the welcome screen is a screen presented to the owner of the mobile device 210 after authentication and providing the owner with information actively. The welcome screen displays diverse additional information in addition to a simple notification. In addition, the welcome screen may be a screen in which information is temporarily stored for a reminder. In response to any particular notification information not being present, the mobile device 210 may enter the welcome screen immediately.

Figure 5A:
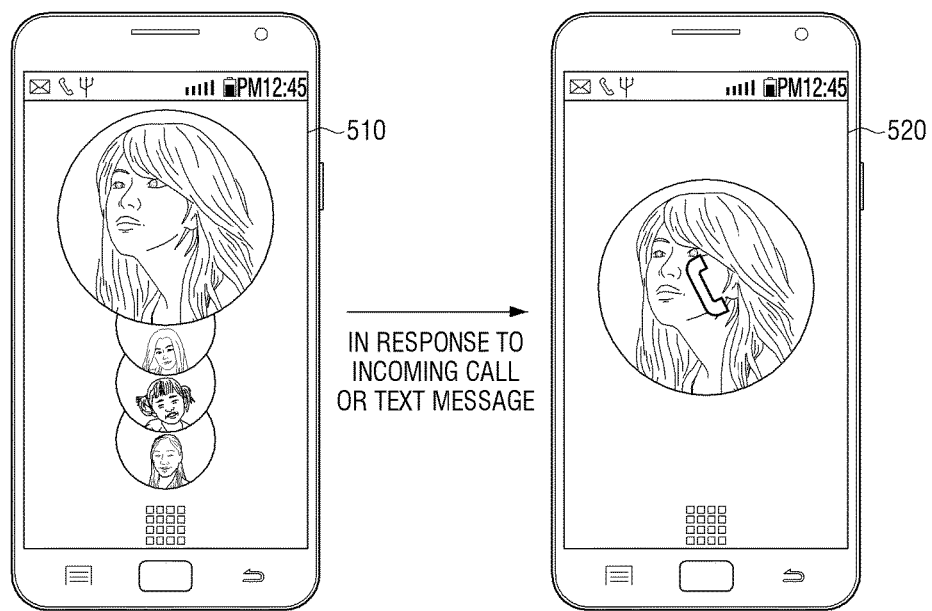
FIGS. 5A and 5B are views provided to compare a screen before authentication and a screen after the authentication of a wearable device according to an embodiment of the present disclosure.
Figure 5B:
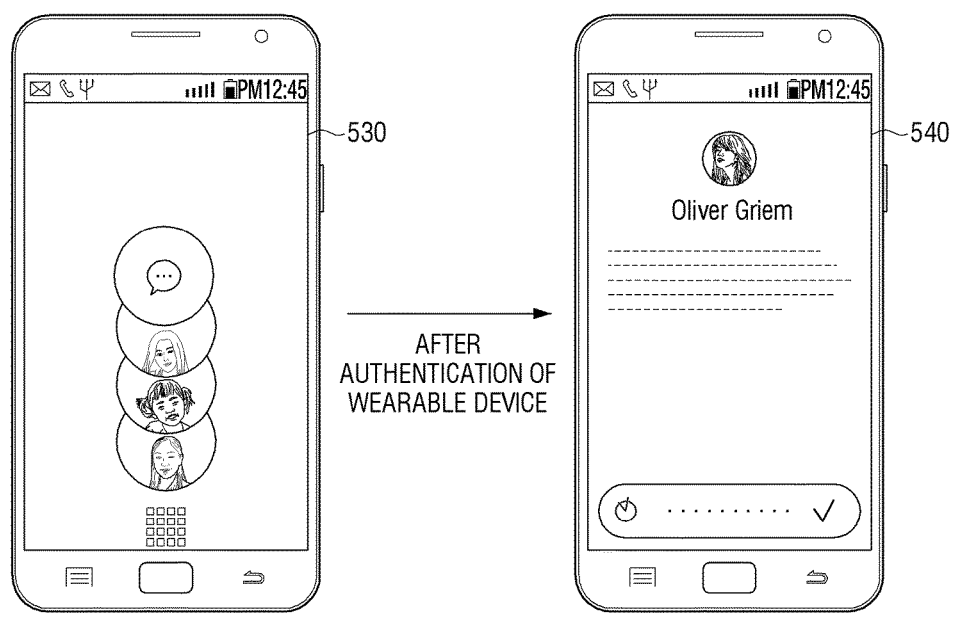

FIGS. 5A and 5B are views provided to compare a screen before authentication and a screen after the authentication of a wearable device according to an embodiment of the present disclosure.

Referring to FIG. 5A, a home screen 510 (or a lock screen) according to an embodiment of the present disclosure is illustrated. According to an embodiment of the present disclosure, only the showcase screen may be displayed before the authentication of the wearable device, as illustrated in screen 520. That is, only the notification regarding the incoming call or text message may be provided. Referring to FIG. 5B, a showcase screen 530 is illustrated. In this process, in response to the authentication being performed by the wearable device 200, for example, the mobile device 210 may display the welcome screen 540.

Figure 6:
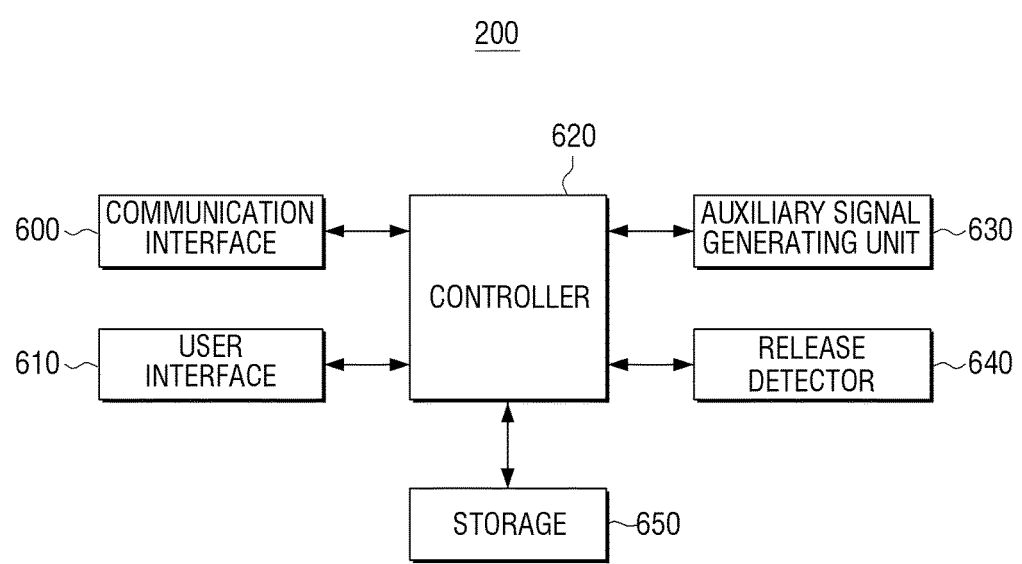
FIG. 6 is a block diagram illustrating a structure of a portable device or a wearable device according to an embodiment of the present disclosure.

FIG. 6 is a block diagram illustrating a structure of a portable device or a wearable device according to an embodiment of the present disclosure.

Referring to FIG. 6, and with reference to FIG. 2 to facilitate explanation, the wearable device 200 according to an embodiment of the present disclosure includes a communication interface 600, a user interface 610, a controller 620, an auxiliary signal generating unit 630, a release detector 640, and a storage 650.

Herein, including a part or all of components signifies that a part of the components, such as the release detector 640 or the storage 650, is omitted or a part of the components, such as, the release detector 640, is integrated with the auxiliary signal generating unit 630. In this case, the illustrated wearable device 200 includes only some components to facilitate understanding of the embodiment of the present disclosure.

The communication interface 600 performs communication with the mobile device 210. More particularly, the communication interface 600 performs the local area communication with the mobile device 210 according to the communication method such as BT, Wi-Fi, etc. For example, a BT signal has a communication radius of 1.5 meter (m), and an approach between the wearable device 200 and the mobile device 210 may be determined through a signal strength (received signal strength indicator (RSSI)). The communication interface 600 may also perform the communication according to the communication method such as CDMA or WCDMA. The wearable device 200 and the mobile device 210 may recognize each other by transmitting/receiving a device ID.

The user interface 610 may include a button input unit and/or a display. The display may display information or image data, and in response to the display being realized as a touch screen, a user may perform an authentication through the button input unit or the display. For example, the user is able to input a password by using the button input unit or button keys displayed in the display or by drawing a certain pattern based on graphical objects displayed in the touch screen, thereby authenticating that the user is the entitled user of the wearable device 200. Accordingly, the user interface 610 provides authentication information through an interface with the user.

The controller 620 may control a part or all of the communication interface 600, the user interface 610, the auxiliary signal generating unit 630, the release detector 640, and the storage 650 of the wearable device 200. For example, the controller 620 may be connected to the mobile device 210 which is determined to be proximate to the wearable device 200 through the communication interface 600. The controller 620 may also compare the authentication information received through the user interface 610 with information stored in the storage 650 to determine whether the user is the entitled user. In addition, the controller 620 may control to transmit a detected result of the release detector 640 to the mobile device 210 through the communication interface 600.

In addition, the controller 620 may further include a demultiplexer (not shown), a decoder (not shown), a scaler (not shown), and the like so that the wearable device 200 operates as an image processor. The demultiplexer may divide an inputted image signal into a video signal, an audio signal, and additional information. The decoder may decode an encoded video signal and audio signal. The scaler may perform an operation such as resolution conversion, etc.

The auxiliary signal generating unit 630 may generate a magnetic field or the infrared light as an auxiliary signal. For example, in case of a magnetic field, the auxiliary signal generating unit 630 may be realized in the manner of installing a magnetic substance on the strap of the wearable device 200. In this case, the auxiliary signal generating unit 630 may adjust a diffusion length of the magnetic field by changing a form of the magnetic characteristics. Meanwhile, the infrared light may be an LED. For example, in response to determining that the wear of the wearable device 200 is performed through the release detector 640, the auxiliary signal generating unit 630 may emit the infrared light.

The release detector 640 may detect whether the wearable device 200 is attached to a user. In response to a magnetic field not being detected from the wearable device 200, the mobile device 210 may determine that the wearable device 200 is not attached to the user. However, in order to enhance accuracy on the security, it is desirable to detect the attachment or detachment through the release detector 640. For example, the release detector 640 may include a signal detector for detecting a magnetic field provided by the auxiliary signal generating unit 630 disposed in a certain side or include a light receiver for receiving the emitted infrared light. Accordingly, in response to the magnetic field not being detected by a signal detector on a side that opposes the certain side or in response to the infrared light not being received by the light receiver, the release detector 640 may determine that the wearable device 200 is detached and transmit the release information to the mobile device 210. The mobile device 210 may stop the predetermined operation according to the release information.

The storage 650 may temporarily store information or various image data processed by the controller 620 and may also store the authentication information for performing the authentication of the wearable device 200. In this case, the authentication information may be a password, pattern information, or fingerprint information. In addition, in response to a request from the controller 620, the storage 650 may output the stored authentication information.

Figure 7:
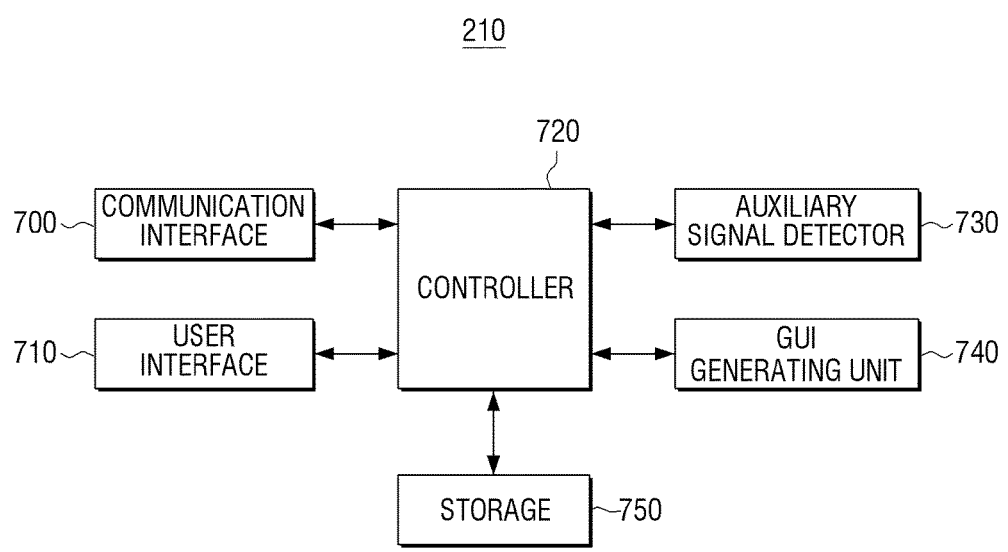
FIG. 7 is a block diagram illustrating a structure of an electronic device or a mobile device according to an embodiment of the present disclosure.

FIG. 7 is a block diagram illustrating a structure of an electronic device or a mobile device according to an embodiment of the present disclosure.

Referring to FIG. 7, and with reference to FIG. 2 to facilitate explanation, the mobile device 210 according to an embodiment of the present disclosure includes a part or all of a communication interface 700, a user interface 710, a controller 720, an auxiliary signal detector 730, a GUI generating unit 740, and a storage 750.

Herein, including a part or all of components signifies that a part of the components, such as, the GUI generating unit 740 and/or the storage 750, is omitted or a part of the components, such as, the GUI generating unit 740 is integrated with other components such as the controller 720. In this case, the mobile device 210 includes all of the components for better understanding of the embodiment of the present disclosure.

In response to the wearable device 200 being searched in the vicinity, the communication interface 700 may perform communication to connect the mobile device 210 with the wearable device 200. For example, in response to device ID information being preset with respect to the certain wearable device 200, the mobile device 210 may be connected to the wearable device 200 automatically through the local area communication. To facilitate this connection, the communication interface 700 may include a local area communication module and may perform the CDMA communication or the WCDMA communication. In addition, in response to the release information notifying that the wearable device 200 is detached from the user, the communication interface 700 may receive and process the release information.

The user interface 710 may include a button input unit and/or a display. For example, in response to the display being realized as a touch screen, the button input unit may be omitted. The mobile device 210 may perform various operations, such as, touch, flip, tap, etc., though an interface with the user interface 710.

The controller 720 may control overall operations of the communication interface 700, the user interface 710, the auxiliary signal detector 730, the GUI generating unit 740, and the storage 750 of the mobile device 210. For example, in response to an auxiliary signal, which is generated by the wearable device 200, being detected by the auxiliary signal detector 730, the controller 720 may perform a predetermined operation. In this case, as described above, the predetermined operation may include various operations of unlocking a lock screen, processing a content including a gallery, etc. For example, in response to the auxiliary signal not being detected, the controller 720 controls the GUI generating unit 740 to display a public screen, such as a showcase screen, as the predetermined operation. In response to the auxiliary signal being detected, the controller 720 may display a private screen such as a welcome screen. In this process, in response to receiving the release information indicating that the wearable device 200 is detached, the controller 720 may stop the operation.

The auxiliary signal detector 730 may detect a magnetic field or infrared light as an auxiliary signal. In this case, the magnetic field has a transmission distance shorter than a transmission distance of a communication signal according to the local area communication, and the auxiliary signal detector 730 may include a magnetic sensor for detecting a magnetic field or may include a hall sensor. The infrared light may have a transmission distance longer than the transmission distance of the communication signal according to the local area communication, but in response to the infrared light being detected, the auxiliary signal detector 730 may include an infrared light receiving sensor. For example, in response to the magnetic field being detected via the auxiliary signal detector 730, the auxiliary signal detector 730 may notify that the magnetic field is detected to the controller 720. Accordingly, the controller 720 may authenticate that the user is the entitled user of the mobile device 210 and perform the predetermined operation.

The GUI generating unit 740 may display GUI screens according to control of the controller 720. For example, the GUI generating unit 740 may generate and display a public screen, that is, the a showcase screen, to be displayed before the authentication of the auxiliary signal, and may generate and display a private screen, that is, the welcome screen after the authentication of the auxiliary signal. In addition, the GUI generating unit 740 may be involved in an operation of generating of various screens. Such operations may be performed by executing a related application, for example.

The storage 750 may temporarily store various information and/or image data processed in the mobile device 210. In addition, in response to receiving an incoming text message or an incoming call according to a call request, the storage 750 may pre-store the showcase screen, which is generated by the GUI generating unit 740, and provide the pre-stored showcase screen. The storage 750 may also pre-store the welcome screen and provide the welcome screen in response to a request of the controller 720.

Figure 8:
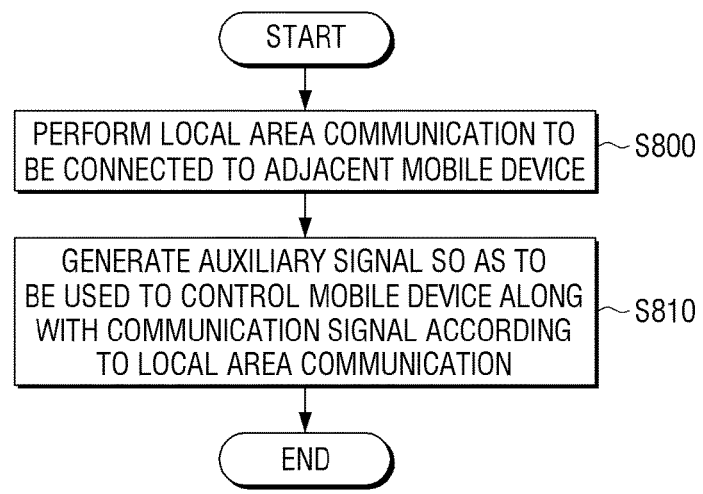
FIG. 8 is a flowchart provided to describe an operation of a wearable device according to the first embodiment of the present disclosure.

FIG. 8 is a flowchart provided to describe an operation of a wearable device according to the first embodiment of the present disclosure.

Referring to FIG. 8, and with reference to FIG. 2 to facilitate explanation, the wearable device 200 performs the local area communication to be connected to the mobile device 210 in the vicinity at operation 5800. The wearable device 200 may search for the mobile device 210, which is recognized in the vicinity, and perform an initial connection operation according to a user selection, and once the mobile device 210 is recognized, the wearable device 200 may be connected to the mobile device 210 automatically.

In response to the mobile device 210 being connected to the wearable device 200, the wearable device 200 generates an auxiliary signal to be used along with a local area communication signal to control the mobile device 210 at operation S810. It may be seen that such signal may be generated at all times, but not limited thereto. In some examples, the wearable device 200 may generate the auxiliary signal in response to determining that two devices are interconnected by the local area communication. The operation of generating an auxiliary signal has been described above, and thus, the detailed description is omitted.

Figure 9:
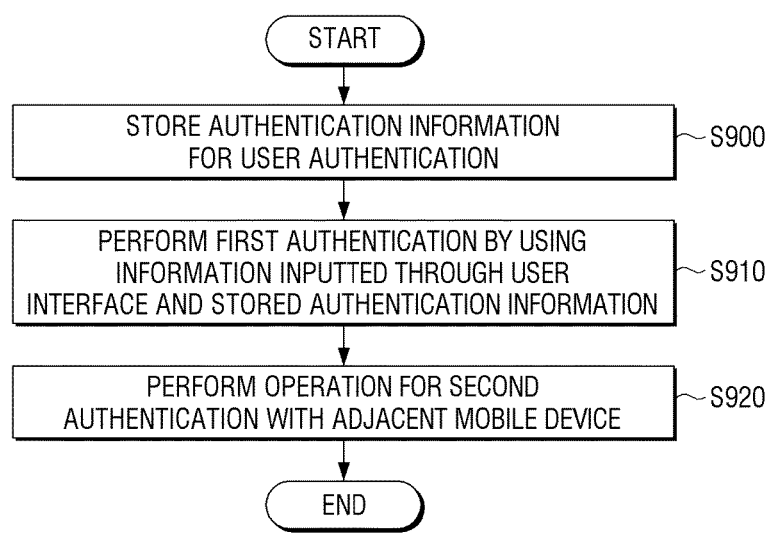
FIG. 9 is a flowchart provided to describe an operation of a wearable device according to the second embodiment of the present disclosure.

FIG. 9 is a flowchart provided to describe an operation of a wearable device according to the second embodiment of the present disclosure.

Referring to FIG. 9, and with reference to FIG. 2 to facilitate explanation, operating the wearable device 200 according to the second embodiment of the present disclosure is different from the operation of driving the wearable device 200 in FIG. 8 in that the user authentication is also performed.

According to the operation of driving the wearable device 200 in FIG. 9, the wearable device 200 may store the authentication information (e.g., a password, pattern information, and fingerprint information, etc.) at operation S900.

Subsequently, the wearable device 200 may compare the stored authentication information with information inputted through the user interface and perform an authentication operation at operation S910. In addition, the wearable device 200 performs user authentication with respect to the wearable device 200. This operation is to provide additional security and may be a first authentication process in the embodiment of the present disclosure.

Meanwhile, operation S920 is similar to the descriptions related to operations S800 and S810 disclosed above with reference to FIG. 8, and thus, the detailed description is omitted.

Figure 10:
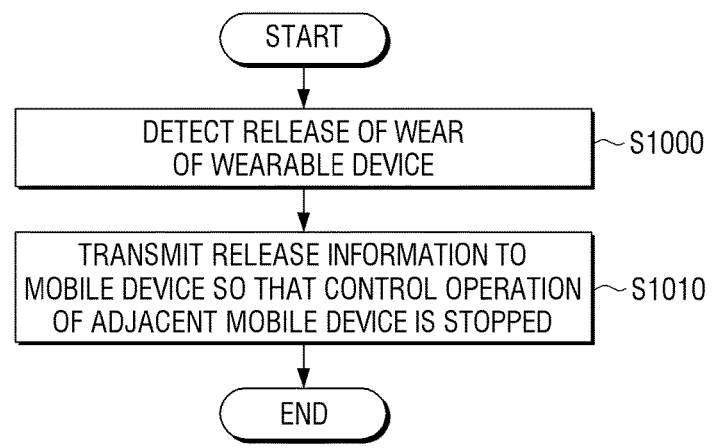
FIG. 10 is a flowchart provided to describe an operation of a wearable device according to the third embodiment of the present disclosure.

FIG. 10 is a flowchart provided to describe an operation of a wearable device according to the third embodiment of the present disclosure.

Referring to FIG. 10, and with reference to FIG. 2 to facilitate explanation, the wearable device 200 according to the third embodiment of the present disclosure determines whether it becomes detached from the user while performing the operations in FIGS. 8 and 9 at operation S1000. For example, a magnetic field generating unit or an infrared light detector may be disposed on a strap of the wearable device 200, and a magnetic field detector or an infrared light receiver may be disposed on the other strap. In response to a magnetic field or infrared light not being detected by the magnetic field detector or the infrared light receiver, the wearable device 200 may detect detachment.

In response to detachment of the wearable device 200, the wearable device 200 may transmit the release information to the mobile device 210 so that the mobile device 210 stops the predetermined operation at operation S1010. Accordingly, the mobile device 210 may stop a particular control operation.

Figure 11:
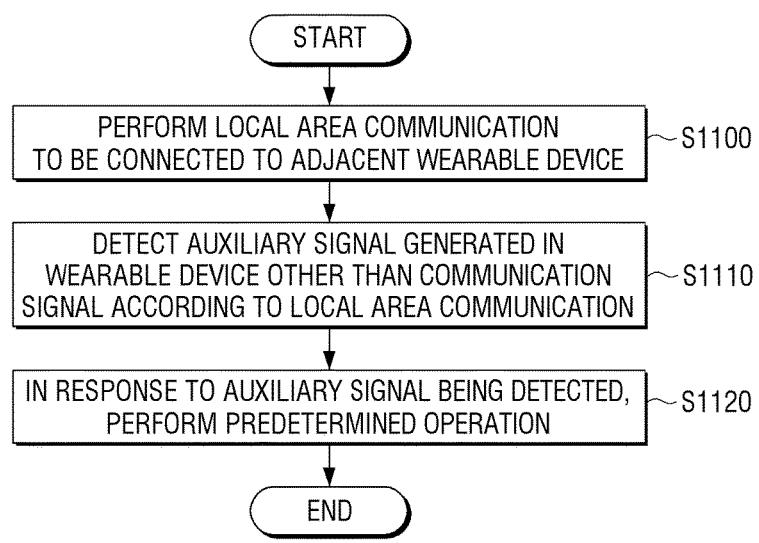
FIG. 11 is a flowchart provided to describe an operation of a mobile device according to the first embodiment of the present disclosure.

FIG. 11 is a flowchart provided to describe an operation of a mobile device according to the first embodiment of the present disclosure.

Referring to FIG. 11, and with reference to FIG. 2 to facilitate explanation, the mobile device 210 according to the first embodiment of the present disclosure performs the local area communication to be connected to the wearable device 200 in the vicinity at operation S1100. That is, in response to the ID information being preset, the mobile device 210 performs the local area communication and performs the connection operation.

Subsequently, the mobile device 210 detects an auxiliary signal generated in the wearable device 200, which is a communication signal from signals associated with the local area communication at operation S1110. As described above, the auxiliary signal may be a magnetic field or infrared light.

In response to the auxiliary signal being detected, the mobile device 210 performs a predetermined operation at operation S1120. That is, the mobile device 210 may control to release a lock screen of the mobile device 210 or expose a screen which belongs to a private area.

Figure 12:
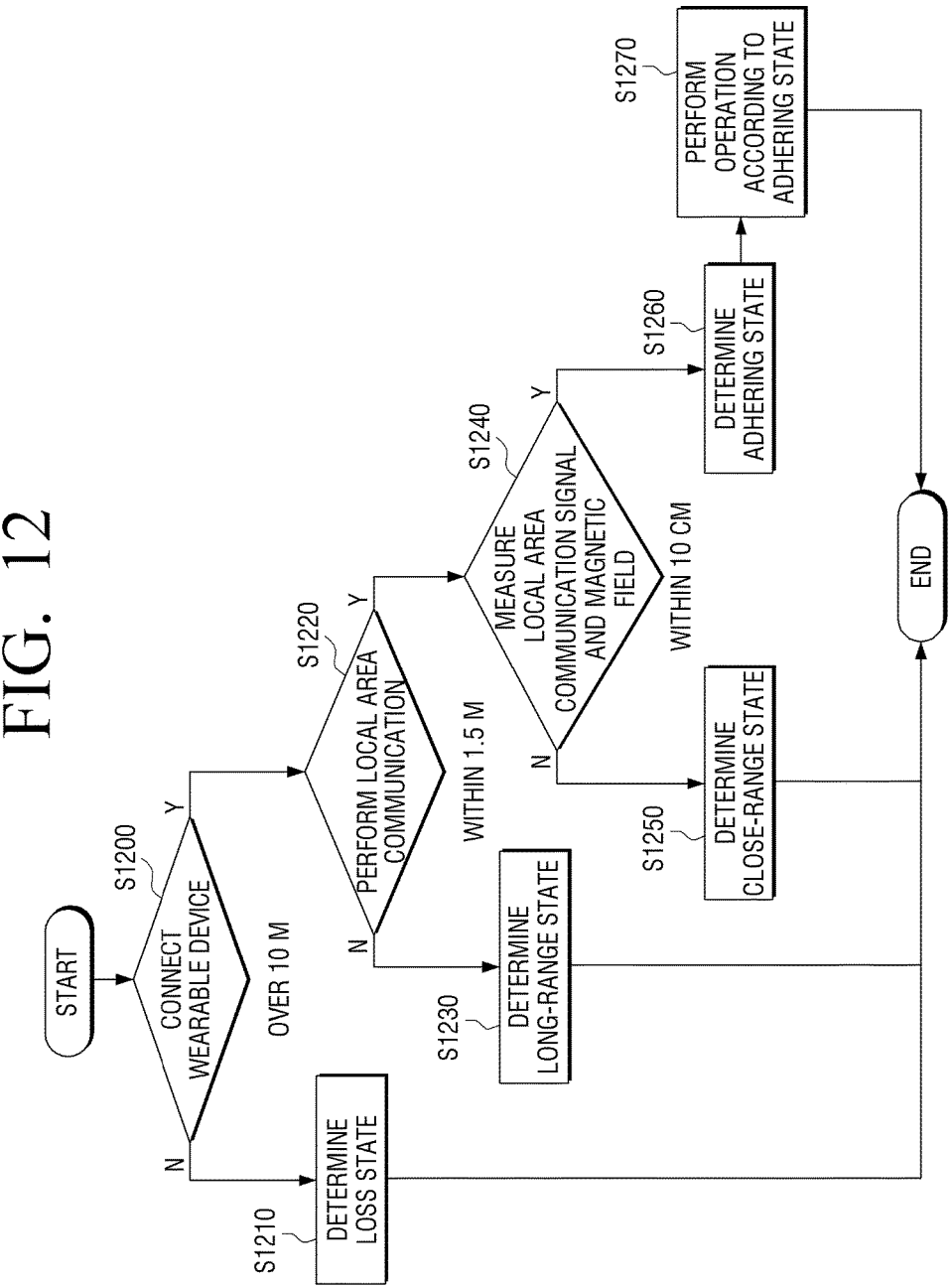
FIG. 12 is a flowchart provided to describe an operation of a mobile device according to the second embodiment of the present disclosure.

FIG. 12 is a flowchart provided to describe an operation of a mobile device according to the second embodiment of the present disclosure. In FIG. 12, it is assumed that an auxiliary signal is a magnetic field.

Referring to FIG. 12, and with reference to FIG. 2 to facilitate explanation, in response to the wearable device 200 not being located within a communication radius (e.g., 10 m) where communication between the mobile device 210 and the wearable device 200 is available, the mobile device 210 may determine that the wearable device 200 is outside the communication radius at operation S1200. In response to determining that wearable device 200 is outside of the communication radius, the mobile device 210 may determine that the wearable device 200 is in a loss state at operation S1210.

In response to the wearable device 200 being located within the communication radius, the mobile device 210 determines whether the local area communication can be performed at operation 1220. In response to determining that the local area communication cannot be performed (e.g., the wearable device is not within 1.5 m), the mobile device 210 may determine that the wearable device is in a long-range state at operation S1230.

In response to determining that the wearable device 200 is located in the communication radius and the local area communication can be performed (e.g., within 1.5 m), the mobile device 210 measures a magnetic field at operation S1240.

If the magnetic field cannot be measured (e.g., the wearable device is not within 10 cm), the mobile device 210 determines that the wearable device 200 is in a close-range state at operation S1250. In response to the magnetic field being measured, the mobile device 210 determines that the situation as the adhering state at operation S1260. For example, a distance of the adhering state may be set to be 10 cm, according to an embodiment of the present disclosure.

In response to the determining that the wearable device 200 is in the adhering state, the mobile device 210 may perform a predetermined operation according to the adhering state at operation S1270. As described above, the mobile device 210 may release a lock screen of the mobile device 210 or expose a screen which belongs to the private area.

Meanwhile, according to the sequential states illustrated in FIG. 12, the mobile device 210 may perform various control operations. The control operations may be schematically described as shown in Table 1 below. In Table 1, the mobile device 210 is referred to as 'mobile,' and the wearable device 200 is referred to as 'gear'.

TABLE 1

| User state | Definition of device connection state | Examples of predetermined operation |
| --- | --- | --- |
| Lock screen | 1) Mobile is lost | No method for releasing lock (contact information of an owner is necessary) |
| | 2) Mobile and gear are located far from each other | Release lock by a drag operation, not a pattern or fingerprint recognition |
| | 3) Mobile and gear are located close to each other | Release lock by a drag operation, not a pattern or fingerprint recognition |
| | 4) Mobile and gear adhere to each other | Lock is released immediately as soon as a user holds a device |
| Notification (incoming call/text message, etc.) | 1) Mobile is lost | Display no notification in lock screen (Answering call is possible) |
| | 2) Mobile and gear are located far from each other | Do not display lock screen and play back sound. Display notification in gear. |
| | 3) Mobile and gear are located close to each other | Display lock screen and play back sound. Display notification in gear. |

TABLE 1-continued

| User state | Definition of device connection state | Examples of predetermined operation |
|---|---|---|
| | 4) Mobile and gear adhere to each other | Display lock screen and play back sound. Do not display notification in gear. |
| Gallery (default application) | 1) Mobile is lost | Display general picture thumbnail list |
| | 2) Mobile and gear are located far from each other | Display general picture thumbnail list |
| | 3) Mobile and gear are located close to each other | Display general picture thumbnail list |
| | 4) Mobile and gear adhere to each other | Provide affordance of enabling user to access to hidden pictures → See pictures after fingerprint recognition (highest security level) |

Referring to Table 1, the mobile device 210 may provide different experiences depending upon a user and a device connection state. Accordingly, user-accessible information and functions may be provided depending upon a state, and the security and accessibility may be enhanced. Accordingly, natural user experience (UX) may be provided according to user authentication.

Figure 13:
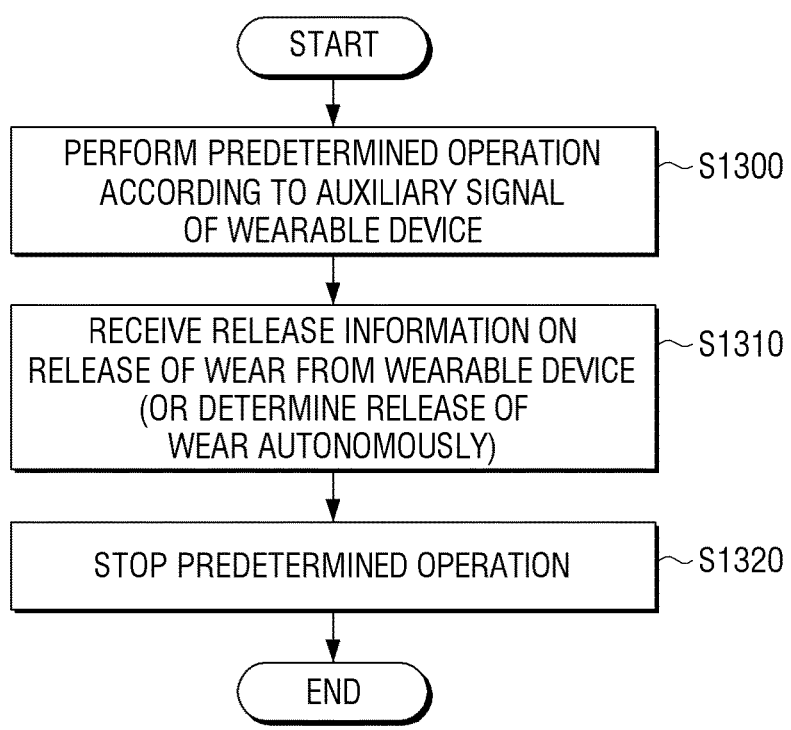
FIG. 13 is a flowchart provided to describe an operation of a mobile device according to the third embodiment of the present disclosure.

FIG. 13 is a flowchart provided to describe an operation of a mobile device according to the third embodiment of the present disclosure.

Referring to FIG. 13, and with reference to FIG. 2 to facilitate explanation, the mobile device 210 according to the third embodiment of the present disclosure may perform the predetermined operations as in FIGS. 11 and 12 at operation S1300. In this case, the predetermined operation may include various operations using content such as a gallery.

Subsequently, the mobile device 210 may receive release information from the wearable device 200 indicating detachment of the wearable device 200, while performing the predetermined operations at operation 1310. In another example, the mobile device 200 may be capable of autonomously determining the detachment of the wearable device 200 at operation S1310.

In response to determining that the wearable device 200 is detached, the mobile device 210 may stop the control operation that is related to the private area or is preset at operation S1320.

Figure 14:
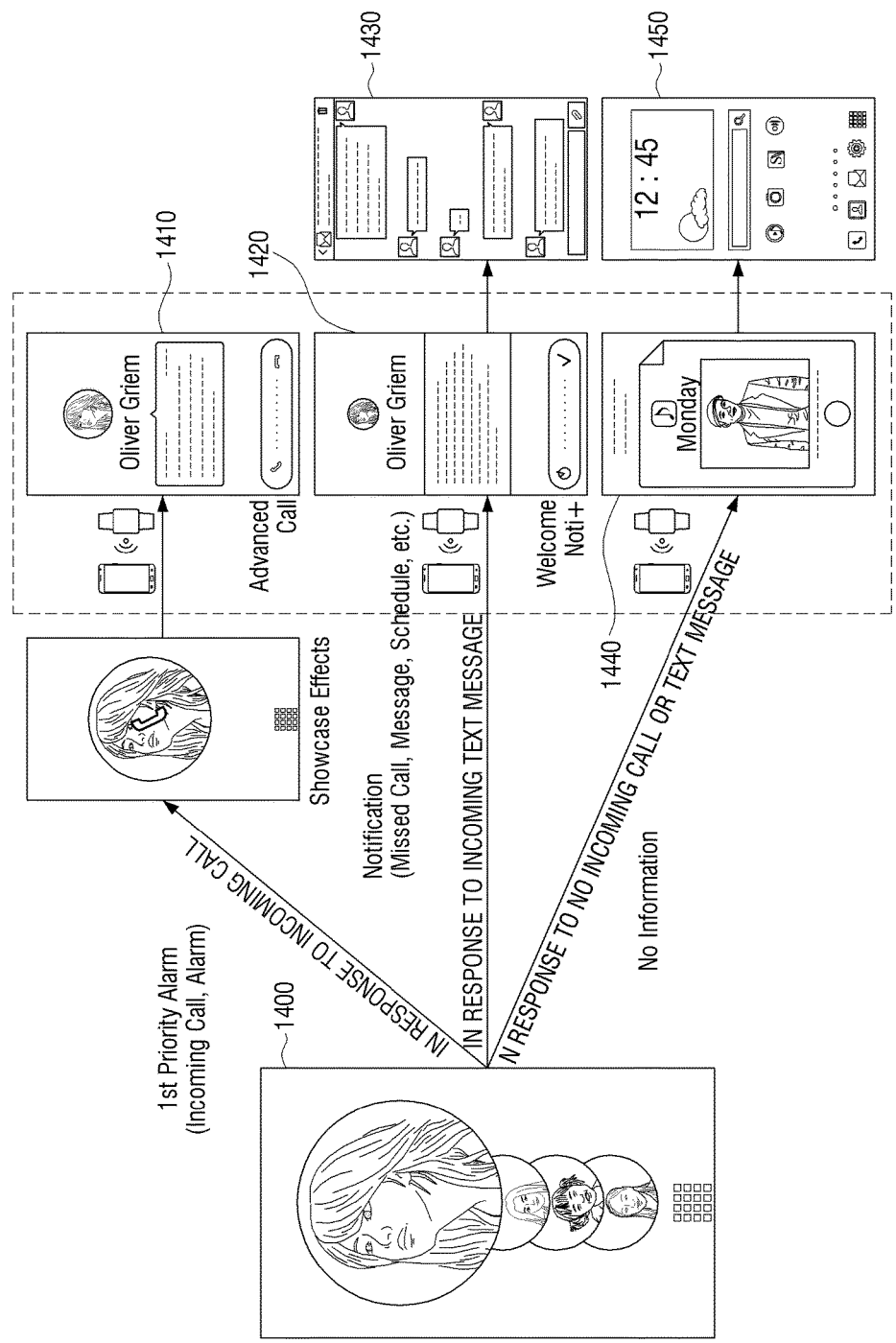
FIG. 14 illustrates views of a welcome screen according to an embodiment of the present disclosure.

FIG. 14 illustrates views of a welcome screen according to an embodiment of the present disclosure.

FIGS. 15A, 15B, 15C, and 15D are views provided to illustrate a welcome screen according to an embodiment of the present disclosure.

Referring to FIGS. 14 and 15A, 15B, 15C, and 15D, after the authentication is performed in a lock screen by the wearable device 200, the mobile device 210 displays a personalized home screen such as a welcome screen 1400 according to a state of the mobile device 210 (i.e., an operational state), rather than directly entering a home screen.

In this case, the welcome screen 1400 enables an owner to access to information quickly and may be a greeting screen for recognizing the owner of the mobile device 210 and actively providing the owner with information. For example, the welcome screen 1400 may be a briefing screen that is displayed when a user holds the mobile device 210 to display information that needs to be checked, such as notifications accumulated during an unused time. In the welcome screen 1400, the user is able to check or delete the notifications or execute a function without entering an application. In addition, the welcome screen 1400 may provide an activity log accumulated in the mobile device 210 and a connected device and a simple control with respect to a device. A user state includes various states of a user, such as user absence, etc. A device state includes various states of a device, such as, a state as to whether a notification is received from outside like an incoming call or text message or a state as to whether the notification is to execute an application stored in the mobile device 210.

A screen 1410 illustrates an operation of displaying a showcase screen before the authentication by the wearable device 200 in response to an incoming call of text message. After the authentication of the wearable device 200, the mobile device 210 displays the welcome screen. In response to an incoming call, the welcome screen may display a caller's number. In response to a telephone directory including a name corresponding to the caller's number, the welcome screen may display the name. Meanwhile, the wearable device 200 is a device that only a particular user is able to wear in order to secure the privacy and the security. In this regard, the wearable device 200 may display the caller's number, the caller's name, or detailed contents of the text message, which is the same as the details in the welcome screen, even though the authentication of the mobile device 210 is not yet performed.

Figure 15C:
FIGS. 15A, 15B, 15C, and 15D are views provided to illustrate a welcome screen according to an embodiment of the present disclosure.
Figure 15D:
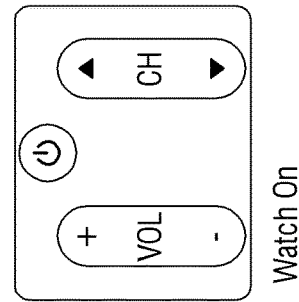
Figure 15B:
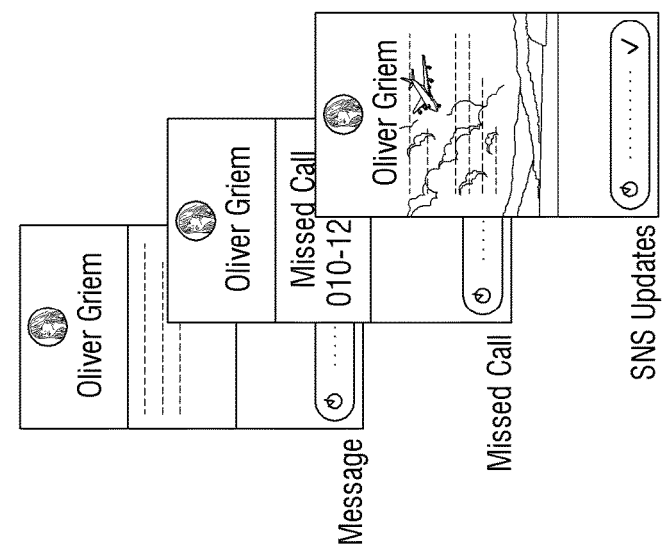
Figure 15A:
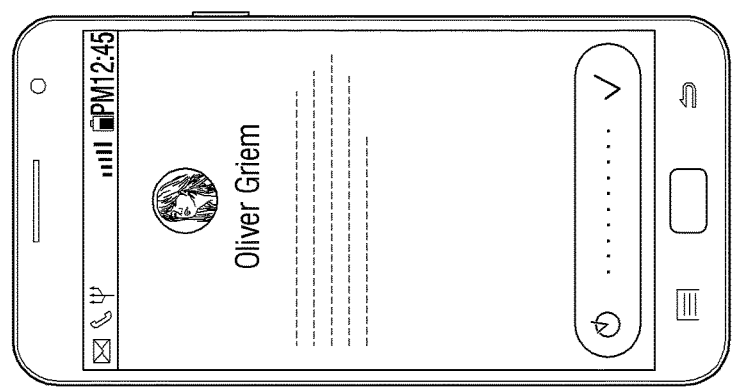

In response to a missed call, unchecked message, unchecked schedule information, or update information on a social networking service (SNS), that is, in response to the wearable device 200 performing authentication with respect to a notification received from outside by the communication when a user is absent, as illustrated in screen 1420 and a screen illustrated in FIG. 15B, the mobile device 210 may display details on the missed call, message, schedule information, and SNS update information in the welcome screen. That is, as soon as the user of the wearable device 200 holds the mobile device 210, the mobile device 210 may display the welcome screen. In this case, the displayed details may be caller information such as a telephone number or name. In response to the user touching an unchecked message, the mobile device 210 may display detailed contents of a received/sent message in the screen, as illustrated in screen 1430.

In addition, in response to no information and in response to information on an application (hereinafter referred to as 'App') stored by the user after the authentication of the wearable device 200, the mobile device 210 may display the information on the App as the welcome screen as illustrated in screen 1440. In response to the user executing the App, for example, music, the mobile device 210 may play back the music immediately, but in response to the user not executing the App, the mobile device 200 may display screen 1450.

In addition, in connection with the certain accumulated notifications such as SNS notifications, the user of the mobile device 210 may check and delete the notifications. In connection with a notification which requires a reminder, the user may store the related information. The stored information may be displayed by a flip operation of the user. Screen 1450 illustrates an example of displaying App-related information stored according to the above operation in the welcome screen.

In response to the App-related information being information according to an execution of an App stored in the mobile device 210, the mobile device 210 may display the App-related information as the Welcome screen as illustrated in FIGS. 15C and 15D. That is, in response to an App (S-Health™) for checking a physical condition of a user periodically being stored in the mobile device 210, the mobile device 210 may display a checked result as the welcome screen after the authentication of the wearable device 200. In response to an App for controlling a TV being stored in the mobile device 210 and the user holding the mobile device 210 in the vicinity of a TV while wearing the wearable device 200, the mobile device 210 may display a screen as illustrated in FIG. 15D as the welcome screen. In this case, the watch on screen belongs to a kind of control screen.

As described above, the welcome screen according to the embodiment of the present disclosure may be realized in various forms, and in response to the authentication of the wearable device 200 being performed, may recognize an owner and display desired information to the owner actively.

Meanwhile, although it has been described that entire components constituting the various embodiments of the present disclosure are combined as a single component or operate by being combined with each other, the various embodiments are not limited thereto. That is, unless it goes beyond the purpose of the various embodiments of the present disclosure, the entire components may be selectively combined as one or more components. In addition, each of the entire components may be implemented as independent hardware. Alternatively, a part or all of the components may be selectively combined and implemented as a computer program having a program module which performs a part or all functions combined in one or a plurality of pieces of hardware. Codes and code segments constituting the computer program may be easily derived by a person having ordinary skill in the art. The computer program may be stored in a non-transitory computer readable recording medium and read and executed by a computer thereby implementing the various embodiments of the present disclosure.

In this case, the non-transitory computer readable recording medium refers to a medium which may store data permanently or semi-permanently rather than storing data for a short time such as a register, a cache, and a memory and may be readable by an apparatus. As an example, the above-described various applications and programs may be stored in the non-transitory computer readable recording medium such as a compact disc (CD), a digital versatile disc (DVD), a hard disk, a Blu-ray™ Disc, a universal serial bus (USB), a memory card, a read-only memory (ROM), and the like, and provided therein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile device comprising:
   a display; and
   at least one processor configured to:
      receive information,
      determine whether a wearable device is proximate to the mobile device, and
      in response to determining that the wearable device is proximate to the mobile device, control the display to display one of a private screen comprising the information and a public screen comprising a notification that the information is received based on whether the wearable device is authenticated by the wearable device.

2. The mobile device of claim 1,
   wherein the wearable device is authenticated based on authentication information input into the wearable device, and
   wherein, the at least one processor is further configured to, when the information is received and the wearable device is authenticated by the wearable device, control the display to display the private screen.

3. The mobile device of claim 2, wherein the at least one processor is further configured to, when the information is received and the wearable device is not authenticated, control the display to display the public screen comprising the notification that the information is received.

4. The mobile device of claim 2, wherein the at least one processor is further configured to:
   determine if the information is received while a user using the wearable device is absent, and
   when the information is received and the wearable device is authenticated, include the information in the private screen.

5. The mobile device of claim 1, wherein the at least one processor is further configured to, when second information is generated by the mobile device, include the second information in the private screen.

6. The mobile device of claim 1,
   wherein the at least one processor is further configured to, when the information is not received, determine an application to include in the private screen.

7. The mobile device of claim 1, further comprising:
   a communication device configured to connect the mobile device to the wearable device; and
   an auxiliary signal detector configured to detect an auxiliary signal generated by the wearable device,
   wherein, when the auxiliary signal is detected, the at least one processor is further configured to determine if the wearable device is authenticated based on the auxiliary signal.

8. The mobile device of claim 7,
   wherein a communication signal of the communication device has a transmission distance shorter than a transmission distance of the auxiliary signal, and
   wherein the auxiliary signal includes a magnetic field.

9. The mobile device of claim 1, further comprising:
   a GUI generating unit configured to generate the public screen and generate the private screen.

10. A method for displaying a screen of a mobile device comprising:
    receiving information;
    determining whether a wearable device is proximate to the mobile device; and in response to determining that the wearable device is proximate to the mobile device, displaying one of a private screen comprising the information and a public screen comprising a notification that the information is received based on whether the wearable device is authenticated by the wearable device.

11. The method of claim 10, further comprising:
when the information is received and the wearable device is authenticated by the wearable device, displaying the information in the private screen,
wherein the wearable device is authenticated based on authentication information input into the wearable device.

12. The method of claim 11, when the information is received and the wearable device is not authenticated, displaying the public screen comprising the notification that the information is received.

13. The method of claim 11, further comprising:
determining if the information is received while a user using the wearable device is absent, and
when the information is received and the wearable device is authenticated, including the information in the private screen.

14. The method of claim 10, further comprising, when second information is generated by the mobile device, including the second information in the private screen.

15. The method of claim 10, further comprising, when the information is not received by the mobile device, determining an application to include in the private screen.

16. A non-transitory computer-readable recording medium comprising a program for executing a method for displaying a screen of a mobile device, the method comprising:
receiving information;
determining whether a wearable device is proximate to the mobile device; and
in response to determining that the wearable device is proximate to the mobile device, displaying one of a private screen comprising the information and a public screen comprising a notification that the information is received based on whether the wearable device is authenticated by the wearable device.

17. A wearable device comprising:
an input device configured to receive authentication information from a user;
a communication device configured to connect the wearable device to a mobile device;
an auxiliary signal generating unit configured to generate an auxiliary signal; and
at least one processor configured to, in response to the wearable device being connected to the mobile device and the wearable device being authenticated based on the authentication information, control the auxiliary signal generating unit to generate the auxiliary signal comprising a magnetic field.

18. The wearable device of claim 17, wherein the auxiliary signal has a transmission distance shorter than a transmission distance of a communication signal of the communication device.

19. The wearable device of claim 17, further comprising:
a storage configured to store authentication information,
wherein the at least one processor is further configured to determine if the wearable device is authenticated by comparing the stored authentication information with second authentication information received though a user interface.

20. The wearable device of claim 17, further comprising:
a release detector configured to detect detachment of the wearable device,
wherein the communication device transmits release information to the mobile device to stop displaying a private screen.

21. The wearable device of claim 17, wherein the at least one processor is further configured to generate a user interface to perform authentication with respect to the user who uses the wearable device,
wherein a communication signal and the auxiliary signal are used for a second authentication.

22. A method for controlling a wearable device, the method comprising:
receiving authentication information from a user;
determining whether the wearable device is authenticated based on the authentication information;
when the wearable device is authenticated and the wearable device is proximate to a mobile device, performing local area communication to connect the wearable device to the mobile device; and
in response to connecting to the mobile device, generating an auxiliary signal comprising a magnetic field to control the mobile device.

* * * * *